Patented Aug. 15, 1933

1,922,646

UNITED STATES PATENT OFFICE 1,922,646

PYROXYLIN COMPOSITION CONTAINING DERIVATIVES OF ETHYLENE GLYCOL

Robert Hubbard Van Schaack, Jr., and Robert Calvert, Chicago, Ill., assignors to Van Schaack Bros. Chemical Works, Inc., a Corporation of Illinois No Drawing. Application October 29, 1926
Serial No. 145,096

9 Claims. (Cl. 134—79)

Our invention relates to a new and useful composition of matter comprising a derivative of ethylene glycol with an organic acid, or with two or more organic acids. The object of the invention is to provide a new series of chemical compounds possessing valuable properties which are characteristic of those compounds. Another object is to provide new solvents for nitrocellulose. A further object is to provide pyroxylin lacquers which contain solvents for the pyroxylin which are less volatile than most, if not all, solvents now in use.

Certain compositions disclosed but not claimed here, are claimed in copending application, Serial No. 188,398 filed May 2, 1927, a division of the original application.

When butyl alcohol became available in quantity, its ester with phthalic anhydride came into wide use as a plasticizer in lacquers. Now that ethylene glycol is being made, in quantity, we have developed a series of esters derived from the glycol or from ethylene chlorohydrin.

The chemical relationships of these compounds as well as one method of preparation are illustrated by the following procedure. We may first produce beta-hydroxy-ethyl phthalate as by refluxing an excess (more than two molecular weights) of anhydrous ethylene chlorohydrin with one molecular weight of potassium phthalate. The reaction is (1) $C_6H_4.(COOK)_2 + 2ClCH_2.CH_2OH =$
$C_6H_4.(COOCH_2.CH_2OH)_2.2KCl$.

The precipitated potassium chloride is removed by settling or filtration. The excess of ethylene chlorohydrin is removed by distillation. The new compound, beta-hydroxy-ethyl phthalate, is then purified in any suitable manner, as by dissolving in alcohol, filtering with decolorizing charcoal, and then evaporating the alcohol. Or, the beta-hydroxy-ethyl phthalate may be converted to a derivative formed by esterifying one or both of the remaining hydroxyl groups with acetic or other volatile organic acid. Thus, we may produce the reaction

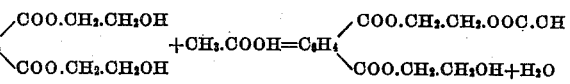

beta-hydroxy-ethyl phthalate+acetic acid=beta-acetyl oxy-ethyl beta-hydroxy-ethyl phthalate+water, or

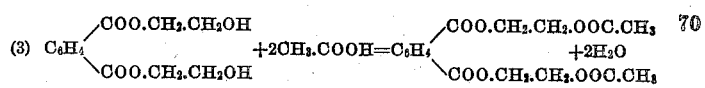

the products here being beta-acetyl oxy-ethyl phthalate and water.

We may substitute for the acetic acid, other organic acids, such as propionic, or butyric. Also, we may substitute the salts of other acids than phthalic acid in reaction (1) above. Thus we may use, for example, the salt of a fatty, monobasic acid such as stearic, $C_{17}H_{35}.COOH$, or a fatty dibasic acid such as oxalic $(COOH)_2$, an aromatic monobasic acid such as benzoic $C_6H_5.COOH$, some other dibasic aromatic acid than phthalic, or a polybasic organic acid. We may use the radicals of different acids on the two sides of the ethylene grouping.

Also, we may vary the method of preparation of the compound. In one preparation, for example, we have esterified ethylene glycol monoacetate with phthalic anhydride in the presence of a trace of sulfuric acid. In another, we have digested 2 molecules of ethylene glycol with one molecule of phthalic anhydride, with the same catalyst as before, and then esterified the product with 2 molecules of acetic acid.

To illustrate our invention more broadly, we list below several types of our new compounds with an example of each.

| No. | Example | Type formula |
|---|---|---|
| A | $C_{17}H_{35}.COO.CH_2.CH_2OH$<br>Ethylene Glycol monostearate | $R^1.CH_2.CH_2OH$ |
| B | $B_{17}H_{35}.COO.CH_2.CH_2.OOC.CH_3$<br>Ethylene monostearate monoacetate | $R^1.CH_2.CH_2.R^2$ |
| C | $(COO)_2(CH_2.CH_2OH)_2$<br>Ethylene glycol monooxalate | $R^3.(CH_2.CH_2.OH)_2$ |
| D | $(COO)_2(CH_2.CH_2.OOC.CH_3)_2$<br>beta-acetyl oxy-ethyl oxalate | $R^3.(CH_2.CH_2.R^2)_2$ |
| E | $C_6H_5.COO.CH_2.CH_2OH$<br>Ethylene Glycol monobenzoate | $R^4.CH_2.CH_2OH$ |
| F | $C_6H_5.COO.CH_2.CH_2.OOC.CH_3$<br>Ethylene monobenzoate monoacetate | $R^4.CH_2.CH_2.R^2$ |
| G | $C_6H_4\begin{matrix}COO.CH_2.CH_2OH\\COO.CH_2.CH_2OH\end{matrix}$<br>beta-hydroxy-ethyl phthalate | $R^5.(CH_2.CH_2OH)_2$ |
| H | $C_6H_4\begin{matrix}COO.CH_2.CH_2.OOC.CH_3\\COO.CH_2.CH_2OH\end{matrix}$<br>beta-acetyl oxy-ethyl beta-hydroxy-ethyl phthalate | $R^5\begin{matrix}CH_2.CH_2.R^2\\CH_2.CH_2OH\end{matrix}$ |
| I | $C_6H_4\begin{matrix}COO.CH_2.CH_2.OOC.CH_3\\COO.CH_2.CH_2.OOC.CH_3\end{matrix}$<br>beta-acetyl oxy-ethyl phthalate | $R^5(CH_2.CH_2.R^2)_2$ |

The compounds illustrated in Examples A to I are not appreciably voltatile at ordinary temperatures, do not boil below 260° C., at atmospheric pressure, are solvents for pyroxylin (with the exception of the types illustrated by the stearates in examples A and B), and are best identified by their saponification numbers, analysis for C, H, and O, and qualitative tests for the various groups present.

For convenience, in the claims and elsewhere, we define the names of the new compounds there used to mean the compounds of the formulas given in Examples A to I in association with the several names. The significance of all names as used by us is evident from the tabulation above.

Also, we attach certain meanings to $R^1$ to $R^5$ inclusive, and intend that these symbols, wherever used by us, should have, respectively, the following meaning:

$R^1$, the radical of an aliphatic, monobasic acid containing more than 10 carbon atoms to the molecule.

$R^2$, the radical of an aliphatic monobasic acid having, to the molecule, less than six carbon atoms.

$R^3$, the radical of an aliphatic, dibasic acid.
$R^4$, the radical of an aromatic, monobasic acid.
$R^5$, the radical of an aromatic, dibasic acid.
There is evident a considerable variation in the particular acid or acids that may be used in the compounds of the several types.

It will be clear that the term radical, as used by us, means the group left by removing the hydrogen from the carboxyl group or groups in the formula of an organic acid. For example, $R^1$ may be the radical of stearic, palmitic, oleic, ricinoleic, or other higher monobasic fatty acid with more than ten carbon atoms to the molecule; $R^2$, the radical of acetic, propionic, butyric, or other monobasic fatty acid that has less than six carbon atoms to the molecule; $R^3$, the radical of such an acid as oxalic, tartaric, or maleic; $R^4$, the radical of benzoic, salicylic, toluic, phenyl acetic, or similar acid; $R^5$, the radical of one of the phthalic acids, such as the ortho-, or other dibasic aromatic acid.

The properties of the beta-acetyl, oxy-ethyl phthalate,

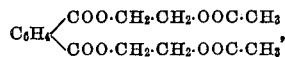

are such as to adapt it especially to commercial usage. In the liquid state it is viscous and, hence, an excellent grinding medium for pigments. It is a solvent and fixative for such esters as occur in certain perfumes. It is practically non-volatile. It is an excellent solvent for proxylin of the degree of nitration corresponding to 12% of nitrogen.

We may use the compounds in a commercially pure state. Or, we may make compositions containing them. Thus we may make films containing pyroxylin with a certain proportion, say, a fourth by weight, of the high boiling solvent. We may so prepare the film as to have in it a resin or a coloring material, or both. Also, we may make a pyroxylin solution comprising volatile solvents and diluents in addition to the high boiling solvent or plasticizer.

One composition illustrating this phase of our invention is the following pyroxylin lacquer:

| | Percent |
|---|---|
| Pyroxylin | 10 |
| Beta-acetyl oxy-ethyl phahalate | 3 |
| Butyl acetate | 35 |
| Toluol | 30 |
| Ethyl acetate | 12 |
| Denatured alcohol | 10 |

All percentages are by weight.

An exposed surface lacquered with such a lacquer will withstand the action of sun and rain better than is the case if the beta-acetyl oxyethyl phthalate is omitted from the composition.

We claim:

1. A composition of matter comprising pyroxylin and an ethylene glycol derivative in which at least one of the hydroxyl groups of the glycol has been replaced by the radical of a phthalic acid.

2. A composition of matter comprising pyroxylin and an ethylene glycol derivative in which at least one of the hydroxyl groups of the glycol has been replaced by the radical of ortho-phthalic acid.

3. A composition of matter comprising pyroxylin and an ethylene glycol derivative in which one of the hydroxyl groups of the glycol has been replaced by the radical of a phthalic acid, and the other hydroxy group of the glycol has been replaced by the radical of another organic acid containing less than 6 carbon atoms to the molecule.

4. A composition of matter comprising pyroxylin and an ethylene glycol derivative in which one of the hydroxyl groups of the glycol has been replaced by the radical of ortho-phthalic acid, and the other hydroxyl group of the glycol has been replaced by the radical of another organic acid containing less than six carbon atoms to the molecule.

5. A composition of matter comprising pyroxylin and beta-acetyl oxy-ethyl phthalate.

6. A composition of matter comprising pyroxylin and beta-acetyl oxy-ethyl ortho-phthalate.

7. A composition of matter comprising pyroxylin, beta-acetyl oxy-ethyl phthalate, and a resin.

8. A composition of matter comprising pyroxylin, beta-acetyl oxy-ethyl phthalate, a resin, and volatile liquids.

9. A composition of matter comprising pyroxylin, beta-acetyl oxy-ethyl phthalate, a resin, and volatile solvents.

ROBERT HUBBARD VAN SCHAACK, Jr.
ROBERT CALVERT.